US009165032B2

(12) United States Patent
Wehrmeister et al.

(10) Patent No.: US 9,165,032 B2
(45) Date of Patent: Oct. 20, 2015

(54) ALLOCATION OF RESOURCES FOR CONCURRENT QUERY EXECUTION VIA ADAPTIVE SEGMENTATION

(75) Inventors: Robert M Wehrmeister, Austin, TX (US); Awny K Al-Omari, Cedar Park, TX (US); Subbarao Kakarlamudi, Milpitas, CA (US); Zbigniew Omanski, San Jose, CA (US); Kashif A Siddiqui, Austin, TX (US); Hansjorg Zeller, Los Altos, CA (US); Peter Friedenbach, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2030 days.

(21) Appl. No.: 11/986,599

(22) Filed: Nov. 21, 2007

(65) Prior Publication Data

US 2009/0132488 A1     May 21, 2009

(51) Int. Cl.
    *G06F 7/00*      (2006.01)
    *G06F 17/30*     (2006.01)
(52) U.S. Cl.
    CPC .... *G06F 17/30445* (2013.01); *G06F 17/30545* (2013.01)
(58) Field of Classification Search
    CPC ................... G06F 17/30445; G06F 17/30545
    USPC .................. 707/764, 769; 708/231, 234, 303
    See application file for complete search history.

(56) References Cited

U.S. PATENT DOCUMENTS

| 5,437,032 | A | * | 7/1995 | Wolf et al. ..................... 718/103 |
| 5,548,770 | A | * | 8/1996 | Bridges ............................. 707/2 |
| 5,574,900 | A | * | 11/1996 | Huang et al. ............ 707/999.001 |
| 5,813,005 | A | * | 9/1998 | Tsuchida et al. ........ 707/E17.032 |
| 5,835,755 | A | * | 11/1998 | Stellwagen, Jr. ................... 707/3 |
| 5,864,840 | A |   | 1/1999 | Leung et al. |
| 5,943,666 | A |   | 8/1999 | Kleewein et al. |
| 6,032,143 | A |   | 2/2000 | Leung et al. |

(Continued)

FOREIGN PATENT DOCUMENTS

| JP | 10-198640 A   | 7/1998 |
| JP | 2007-034414 A | 2/2007 |

OTHER PUBLICATIONS

D. Sciuto, F. Salice, L. Pomante and W. Fornaciari, Metrics for design space exploration of heterogeneous multiprocessor embedded systems, Tenth International Symposium on Hardware/Software Codesign (CODES) (2002), pp. 55-60.*

(Continued)

*Primary Examiner* — Cheyne D Ly
(74) *Attorney, Agent, or Firm* — Hewlett-Packard Patent Department (57) ABSTRACT

An enterprise data warehouse or business intelligence system having a plurality of processors and memory resources. The system includes at least a database server, a workload management system, a query compiler, and a query executor. The database server configured to receive a database query from an application at a database client system. The query compiler configured to prepare the execution plan for the query and compute the number of executive server processes (ESPs) in each ESP layer of the query. The workload management system is configured to generate an affinity value, and the query executor is configured to execute the query. As disclosed herein, placement of the executive server process layers of the query onto processors of the computing system is determined using the affinity value. Other embodiments, aspects and features are also disclosed.

21 Claims, 11 Drawing Sheets

(56) References Cited

U.S. PATENT DOCUMENTS

| | | |
|---|---|---|
| 6,272,501 B1 | 8/2001 | Baumann |
| 7,010,521 B2 | 3/2006 | Hinshaw et al. |
| 7,565,657 B1* | 7/2009 | Leung et al. .................. 718/104 |
| 2003/0037048 A1 | 2/2003 | Kabra et al. |
| 2003/0163512 A1* | 8/2003 | Mikamo ...................... 709/102 |
| 2003/0212668 A1 | 11/2003 | Hinshaw et al. |
| 2005/0050041 A1 | 3/2005 | Galindo-legaria et al. |
| 2005/0081210 A1 | 4/2005 | Day et al. |
| 2005/0108717 A1* | 5/2005 | Hong et al. ................... 718/102 |
| 2006/0047683 A1 | 3/2006 | Lakshminarayan et al. |
| 2006/0129542 A1 | 6/2006 | Hinshaw et al. |
| 2006/0218123 A1 | 9/2006 | Chowdhuri et al. |
| 2006/0230016 A1 | 10/2006 | Cunningham et al. |
| 2007/0124274 A1 | 5/2007 | Barsness et al. |
| 2008/0046895 A1* | 2/2008 | Dillenberger et al. ........ 718/105 |
| 2008/0276261 A1* | 11/2008 | Munshi et al. ................ 719/328 |

OTHER PUBLICATIONS

International Searching Authority, The International Search Report and the Written Opinion, 10 pages.

Supplementary European Search Report, Oct. 14, 2010, 6 pages, European Patent Office, Munich, Germany.

Anastasios Gounaris et al., A novel approach to resource scheduling for parallel query processing on computational grids, Distributed and Parallel Databases, Kluwer Academic Publishers, May 25, 2006, vol. 19, pp. 87-106.

Armstrong B et al., Complier-based tools for analyzing parallel programs, Parallel Computing, Elsevier Publishers, vol. 24, No. 3-4, May 1, 1998, pp. 401-420. Amsterdam, NL.

International Searching Authority, The International Search Report and The Written Opinion, 10 pages, PCT/US2008/083353 Date Unknown.

* cited by examiner

| Number of CPUs per subset 404 | CPU Subsets 402 | | | | | | | | | | | | | | | |
|---|---|---|---|---|---|---|---|---|---|---|---|---|---|---|---|---|
| 16 | 0 | 8 | 4 | 12 | 2 | 10 | 6 | 14 | 1 | 9 | 5 | 13 | 3 | 11 | 7 | 15 |
| 8 | 0 | 8 | 4 | 12 | 2 | 10 | 6 | 14 | 1 | 9 | 5 | 13 | 3 | 11 | 7 | 15 |
| 4 | 0 | 8 | 4 | 12 | 2 | 10 | 6 | 14 | 1 | 9 | 5 | 13 | 3 | 11 | 7 | 15 |
| 2 | 0 | 8 | 4 | 12 | 2 | 10 | 6 | 14 | 1 | 9 | 5 | 13 | 3 | 11 | 7 | 15 |
| 1 | 0 | 8 | 4 | 12 | 2 | 10 | 6 | 14 | 1 | 9 | 5 | 13 | 3 | 11 | 7 | 15 |

AFFINITY VALUE = 5

FIG. 4

- Distribute the ESPs evenly over the entire system

- Place each ESP layer on 1 of $2^N$ distinct CPU subsets based on an affinity value

- Optionally, place each ESP layer of a query on a different CPU subset

Example for consideration:
- A system with 16 CPUs.
- A query with 3 ESP layers of 4 ESPs each.
- An affinty value of 6

A) All ESP layers of the query placed based on single affinity value:
- All ESP layers: {2,6,10,14}

B) Affinity value incremented for subsequent ESP layers:
- First ESP layer: {2,6,10,14}  affinity value = 6
- Second ESP layer: {3,7,11,15}  affinity value = 7
- Third ESP layer: {0,4,8,12}  affinity value = 8

ALLOCATION OF RESOURCES FOR CONCURRENT QUERY EXECUTION VIA ADAPTIVE SEGMENTATION

BACKGROUND

1. Field of the Invention

The present application relates generally to computer and software systems. More particularly, the present application relates to parallel database systems.

2. Description of the Background Art

In a typical business intelligence (BI) environment, the database system processes a large number of queries with a wide spectrum of complexities. The complexity of the queries range from small queries accessing few rows in a database table, to medium queries processing millions of rows, to large queries processing billions of rows. This type of concurrent mixed workload presents challenges for the BI and enterprise data warehouse (EDW) systems. These systems generally include a large number of processors working cooperatively to process the workload.

DETAILED DESCRIPTION

Consider a query to be executed on a BI or EDW system having a large number of central processing units (CPUs). For one query to run on all of the system's CPUs, the query data often needs to be repartitioned, and in certain cases replicated, across the CPUs (i.e. for each CPU). Depending on the size of the query and the number of CPUs, such partitioning may cause a large overhead. The overhead may sometimes even exceed the benefit of the massive parallelism of the BI or EDW system. As such, running all queries at a full degree of parallelism (i.e. on all the CPUs of the system) will generally result in an inefficient use of system resources.

Hence, it is beneficial to have the capability to execute different queries at different degrees of parallelism on a query by query basis. For example, a small query may be most efficiently run on a single CPU, while a large query may take good advantage of all of the system CPUs in order to process a large amount of data effectively. In between those extremes, a medium size query may run more efficiently on a subset of the system CPUs.

However, as determined by the applicants, running small and medium queries on a subset of system CPUs introduces other challenges, including the following.

1) The system needs to figure out the potential required resources for the query to assure that reducing the degree of parallelism does not result in resource shortage.

2) The queries/workload need to be balanced evenly over the system CPUs to ensure fairness in the execution of the queries and an efficient utilization of system resources.

3) The CPU assignments for the queries need to minimize or limit the number of queries that a CPU is executing in order to minimize or limit resource contention and context switching.

Furthermore, query execution times can vary substantially. Hence, even a uniform distribution of queries over the system CPUs does not guarantee a balanced distribution of workload. As such, applicants believe that a good workload balancing across the CPUs generally requires feedback from the runtime system to indicate which CPUs are less utilized than others.

Unlike prior solutions which partition CPU nodes into groups, the solution disclosed herein does not rely on partition schemes set up by the user. Instead, the solution disclosed herein selects a number of CPUs based on pertinent properties of a query, and it automatically balances the queries across the system using adaptive segmentation.

For a query to be executed in parallel, data is distributed to each participating CPU where a portion of the query will be executed using an executive server process (ESP). Depending on the query plan steps, the data may need to be redistributed multiple times to different sets of ESPs for subsequent execution steps. Each group of ESPs executing the same task for a query (on different portions of the data) is called an ESP layer. A query may have one or more ESP layers depending on the execution steps. The maximum number of ESPs in any of the query's ESP layers determines the total number of CPUs needed by the query, which we will refer to as the degree of parallelism.

Figure 1:
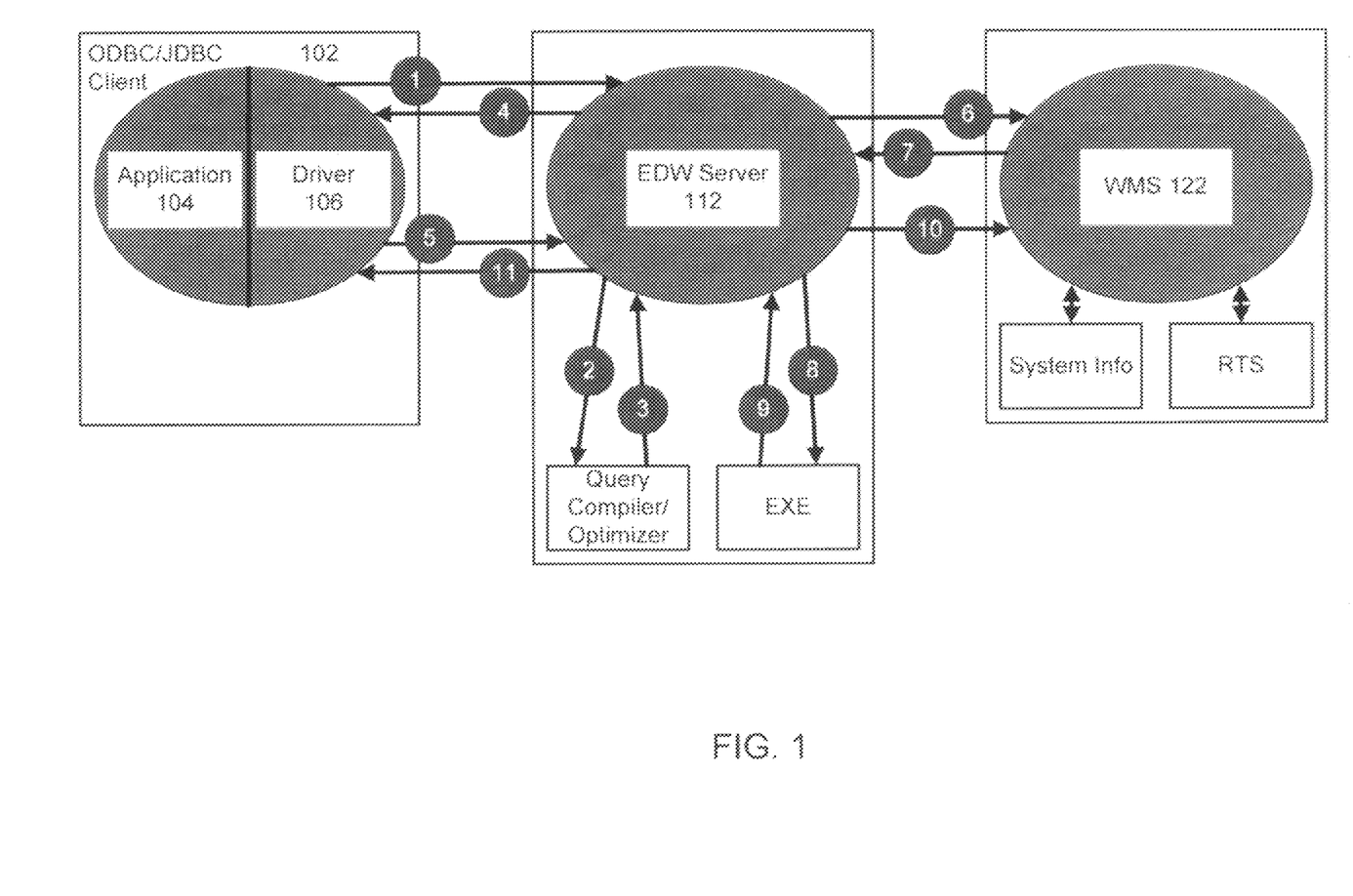
FIG. 1 is schematic diagram showing various components of a system with a sequence of request flows in accordance with an embodiment of the invention.

FIG. 1 is a schematic diagram showing various components of a system with a sequence of request flows in accordance with an embodiment of the invention. As shown, the system of FIG. 1 includes an ODBC/JDBC (open database connectivity or Java database connectivity) client 102 which may comprise an application 104 and a driver 106. Of course, the system may include more than one such client 102. The system also includes an enterprise data warehouse (EDW) server 112 and a workload management services (WMS) system 122. The role of the WMS in this embodiment of the invention is to collect feedback from the runtime system and to generate affinity values based on this feedback. Affinity values are described further below, for example, in relation to FIG. 4. Other embodiments of this invention could have alternative methods of generating affinity values. These could be either external or internal to the EDW server. For example, the EDW server could generate affinity values using a random number generator or the EDW server could generate affinity values based on the source of the query. The sequence of request flows by and between these system components are shown by the arrows and numbered in sequence from 1 to 11.

Figure 2:
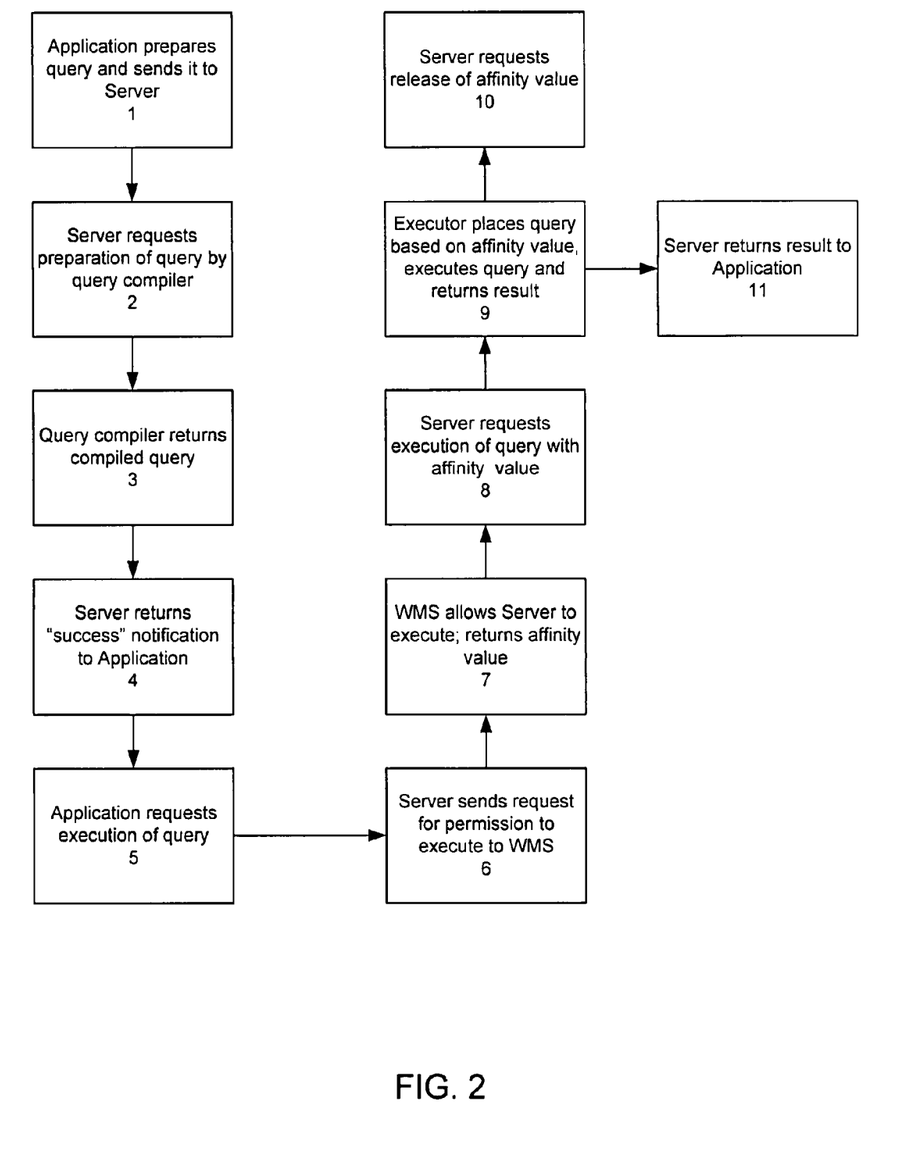
FIG. 2 is a flow chart depicting the sequence of request flows in further detail in accordance with an embodiment of the invention.

FIG. 2 is a flow chart depicting the sequence of request flows in further detail in accordance with an embodiment of the invention. As shown, the first block 1 involves the application 104 preparing a database query and sending the query to the EDW server 112.

In accordance with an embodiment of the invention, the EDW server 112 may use a query optimizer module to determine a maximum degree of parallelism (MDOP) for the query. The query optimizer may generally consider any degree of parallelism from one CPU up to the total number of CPUs in the system. In an environment having a modest number of concurrent queries, better resource utilization may be achieved by a safe reduction of the degree of parallelism for most queries. This may be accomplished by determining the MDOP on a query by query basis. The query optimizer may be configured to only consider query plans with degrees of parallelism that do not exceed the MDOP computed for that query. One technique for determining the MDOP for a query is described below in relation to FIGS. 3A-3C.

In the second block 2, the EDW server 112 requests preparation of the query by its query compiler.

In the third block 3, the query compiler returns the compiled query. At this point the compiled query, while specifying the number of ESPs at each ESP layer, is not bound to any particular subset of CPUs. Thereafter, the EDW server 112 returns a "success" indication or notification to the application 104 per block 4.

The application 104 then requests execution of the query per block 5, and after receiving that request, the server 112 sends a request for permission to execute the query to the WMS 122 per block 6. When appropriate, the WMS 122 allows the server 112 to execute the query per block 7.

In accordance with an embodiment of the invention, the WMS 122 determines an affinity value based on the current runtime state and returns the affinity value to the EDW server 112 per block 7. The affinity value specifies the choice of CPU subsets (adaptive segmentation) to use for placement of executive server processes (ESPs) and may be advantageously used to achieve load balancing. The WMS has access to certain global information about the current state of the system which can be useful in determining the affinity value. This is shown by the WMS system's access to the System Information (System Info) and the runtime system (RTS) in FIG. 1. This global information includes the set of affinity values assigned to queries which are currently executing. Affinity values are described further below, for example, in relation to FIG. 4.

The server 112 requests execution of the query by the executor (EXE) per block 8. Included in the request is the affinity value for use by the executor (EXE). The executor uses the affinity value to place the ESPs onto the CPUs. Techniques disclosed herein for placing the ESPs onto the CPUs using the affinity value are described further below in relation to FIGS. 5 through 8.

The executor (EXE) places the compiled query onto the CPUs based on the affinity value, executes the query and returns the result per block 9. Thereafter, the server 112 requests to the WMS that the affinity value be released per block 10, and also returns the result to the application 104 per block 11.

Figure 3A:
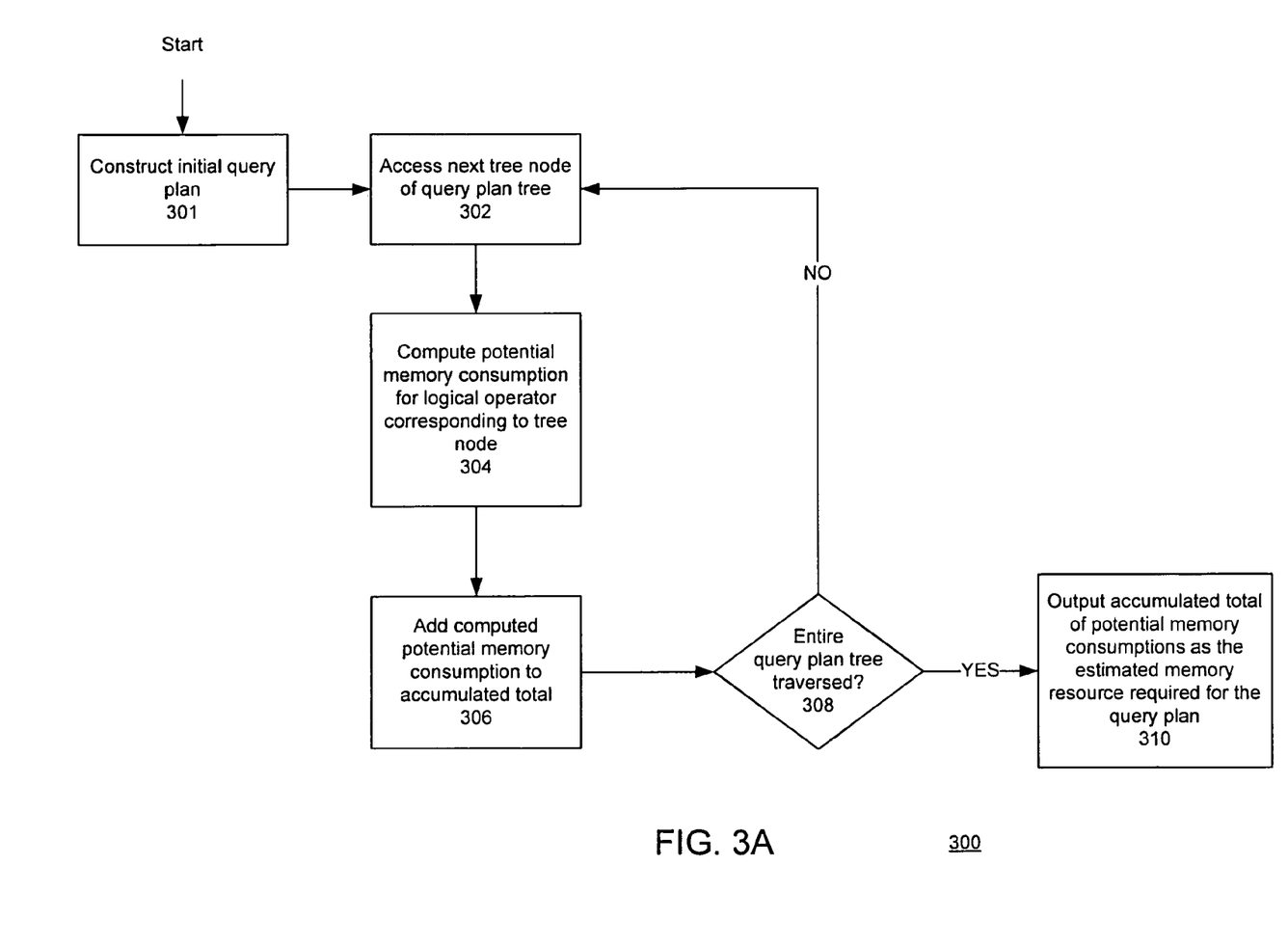
FIG. 3A is a flow chart of a procedure for computing estimated memory resources required for a query in accordance with an embodiment of the invention.

FIG. 3A is a flow chart of a procedure 300 for computing estimated memory resources required for a query in accordance with an embodiment of the invention. First, an initial query plan is constructed 301. This step provides a good overall query plan at an early stage in the optimization. The initial query plan is preferably constructed based on minimizing the cost of accessing the largest table in the query and minimizing the number of records process throughout the join tree. Note that, at this point, the query plan is a tree of logical operators. Once the initial query plan has been formed, the query plan is traversed by accessing 302 each of the tree nodes, computing 304 the potential memory consumption for the logical operator corresponding to the tree node, and accumulating 306 the potential memory consumption for the nodes. Once the entire query plan tree has been traversed 308, then the accumulated total of potential memory consumptions may be output 310 as the estimated memory resource (EMR) required for the query plan.

Figure 3B:
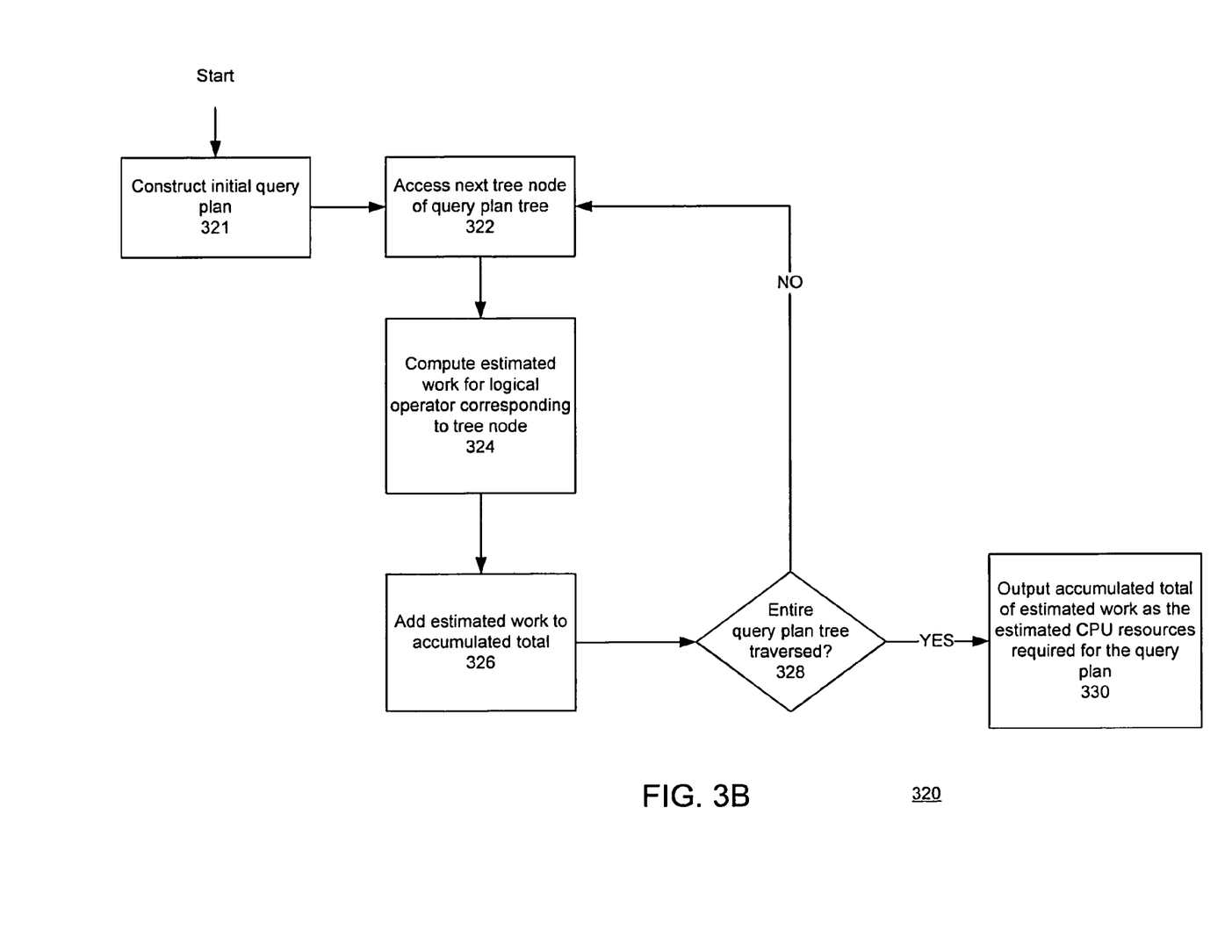
FIG. 3B is a flow chart of a procedure for computing estimated CPU resources required for a query in accordance with an embodiment of the invention.

Similarly, FIG. 3B is a flow chart of a procedure for computing estimated CPU resources required for a query in accordance with an embodiment of the invention. Again, once the initial query plan has been formed 321, the query plan is traversed by accessing 322 each of the tree nodes, computing 324 the estimated work for the logical operator corresponding to the tree node, and accumulating 326 the estimated work for the nodes. Once the entire query plan tree has been traversed 328, then the accumulated total of estimated work may be output 330 as the estimated CPU resource (ECR) required for the query plan.

Figure 3C:
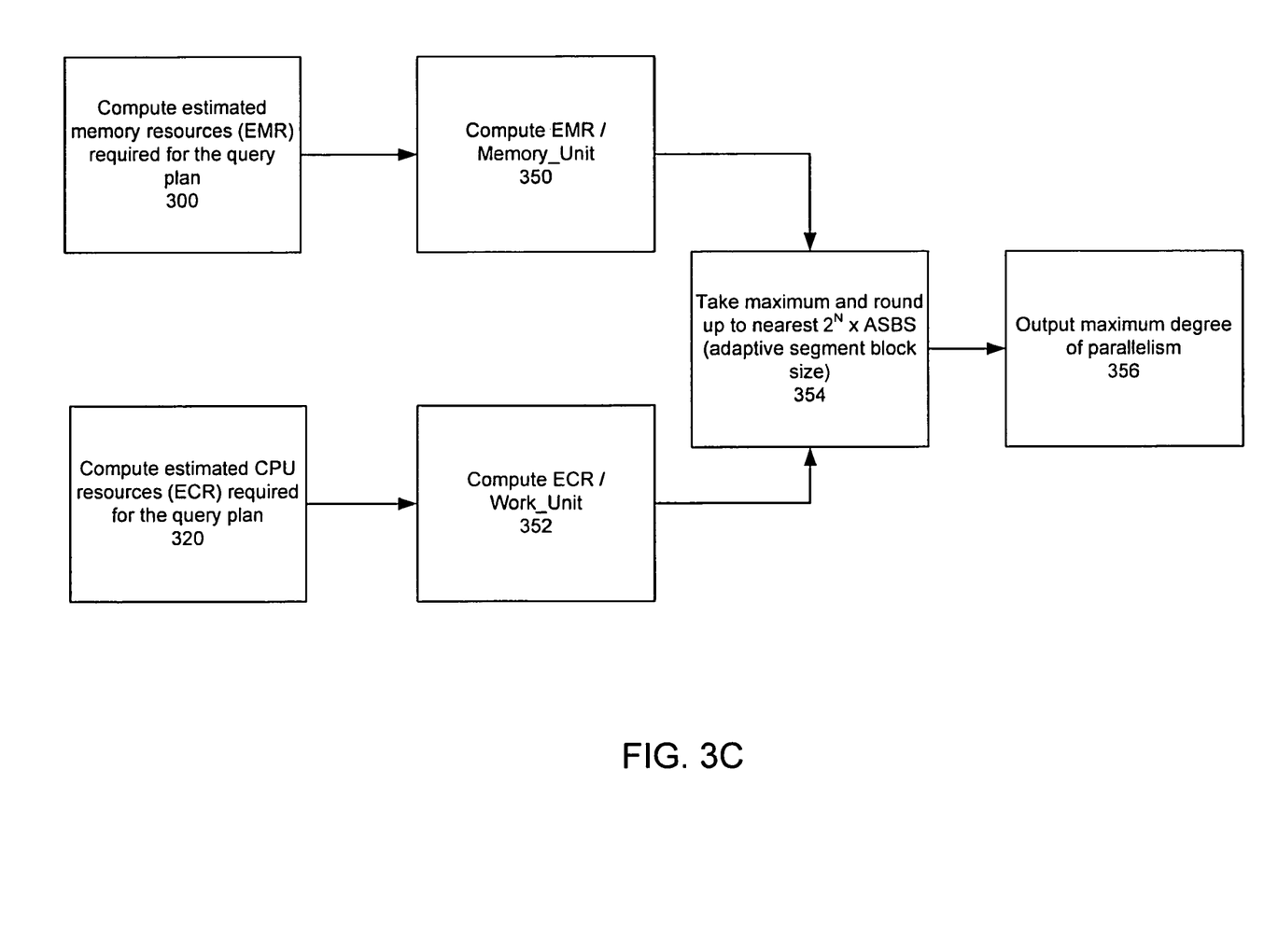
FIG. 3C is a flow chart of a procedure for computing a maximum degree of parallelism for a query in accordance with an embodiment of the invention.

FIG. 3C is a flow chart of a procedure for computing a maximum degree of parallelism for a query in accordance with an embodiment of the invention. The EMR required for the query is computed 300, and the ECR required for the query is computed 320, as described above in relation to FIGS. 3A and 3B.

The EMR is then divided 350 by a constant Memory_Unit that represents the amount of memory available per CPU for any query. This ensures that the degree of parallelism is not limited to an extent that query execution would suffer due to shortage of available memory on the CPUs executing the query. Similarly, the ECR is divided 352 by a constant Work_Unit that represents the amount of work acceptable to be assigned per CPU for any query not running at full system parallelism. This ensures that queries processing large amounts of data will run at a sufficient degree of parallelism.

The maximum value of EMR/Memory_unit and ECR/Work_unit is then selected 354 and that value is rounded up to the nearest $2^M$ times the adaptive segment block size (ASBS), up to the total number of CPUs in the system (where M=0, 1, 2, 3, ... ). The value of ASBS represents the smallest number of CPUs that can be assigned to a single query. This is a system configuration and can be set as low as 1 CPU. The rounded up value is then output as the maximum degree of parallelism (MDOP). This procedure results in different queries being optimized using various degrees of parallelism varying from the minimal ASBS for small queries, to a $2^M$ multiple of ASBS for medium size queries, to the total number of CPUs in the system for very large queries.

Figure 4:
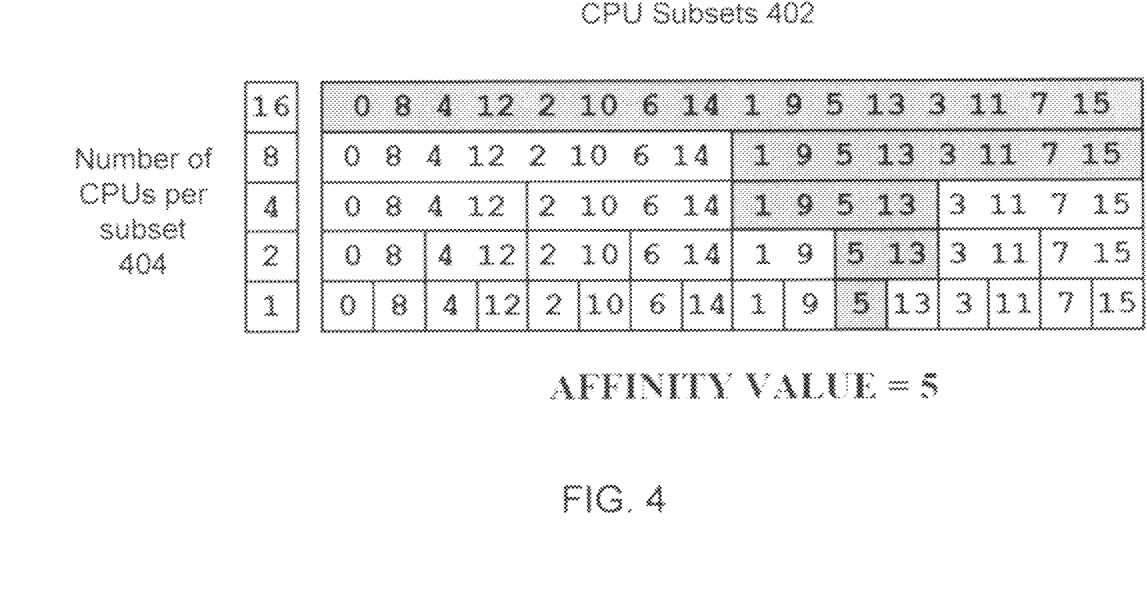
FIG. 4 depicts CPU subsets for an example 16 CPU system for all subset sizes and shows an example affinity group in accordance with an embodiment of the invention.

FIG. 4 depicts CPU subsets 402 for an example 16 CPU system for all subset sizes 404 and shows an example affinity group in accordance with an embodiment of the invention. As shown in each row, the CPU numbers in an interleaved order {0, 8, 4, 12, 2, 10, 6, 14, 1, 9, 5, 13, 3, 11, 7, 15}. While this example parallel computing system has 16 CPUs for relative simplicity of discussion, the present application contemplates that an actual parallel computing system may have many more CPUs, for example, 128 CPUs, or 256 CPUs, or 512 CPUs, and so on.

The first (top) row with CPU subset size of 16 consists of a single CPU subset 402 with all the 16 CPUs. The second row with CPU subset size of 8 consists of two CPU subsets 402, each having 8 CPUs. The first subset has the even numbered CPUs, and the second subset has the odd numbered CPUs. Similarly, the third row with CPU subset size of 4 consists of four CPU subsets 402, each having 4 CPUs, the fourth row with CPU subset size of 2 consists of eight CPU subsets 402, each having 2 CPUs, and the fifth row with CPU subset size of 1 consists of sixteen CPU subsets 402, each having a single CPU.

In this example, the CPU subsets specified by affinity value=5 are shown. The CPU subsets shaded gray are those specified by affinity value=5. As shown, the affinity value specifies one CPU subset 402 for each subset size 404 (i.e. one subset in each row). Since the affinity number is 5, each specified subset includes CPU number 5. Hence, the CPU subset {5} is specified (shaded gray) for CPU subset size 1 (bottom row), the CPU subset {5, 13} is specified for CPU subset size 2, the CPU subset {1, 9, 5, 13} is specified for CPU subset size 4, the CPU subset {1, 9, 5, 13, 3, 11, 7, 15} is specified for CPU subset size 8, and the CPU subset {0, 8, 4, 12, 2, 10, 6, 14, 1, 9, 5, 13, 3, 11, 7, 15} is specified for CPU subset size 16. The set of CPU subsets defined by a given affinity value is called an affinity group.

Figure 5:
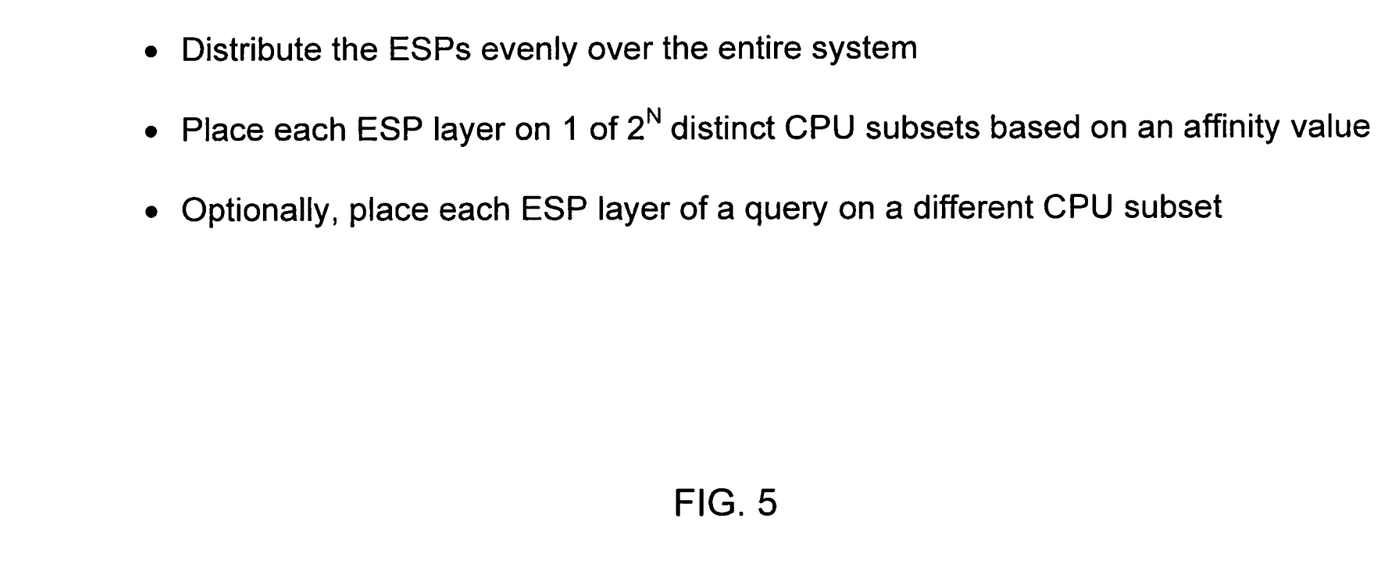
FIG. 5 is a diagram showing aspects and features of placing executive server process (ESP) layers in accordance with an embodiment of the invention.

FIG. 5 is a diagram showing aspects and features of placing executive server process (ESP) layers in accordance with an embodiment of the invention. Each query may have one or more executive server process (ESP) layers that need to be placed onto CPUs for execution thereon, and each ESP layer may have one or more ESPs.

First, the ESPs in a given ESP layer are distributed over the entire system. The distribution may be achieved by using an interleaved ordering of the CPUs for the CPU subsets. The distribution achieved by the interleaved ordering is illustrated by example in FIG. 6, which is described further below.

Second, each ESP layer is placed on one of $2^N$ distinct CPU subsets based on the affinity value returned by the WMS or some other component used for generating affinity values. One implementation of this first aspect is described further below in relation to FIG. 7.

Finally, in a third optional aspect, each ESP layer of a query may be placed based on a different affinity value. One implementation of this third aspect is described further below in relation to FIG. 8.

Figure 6:
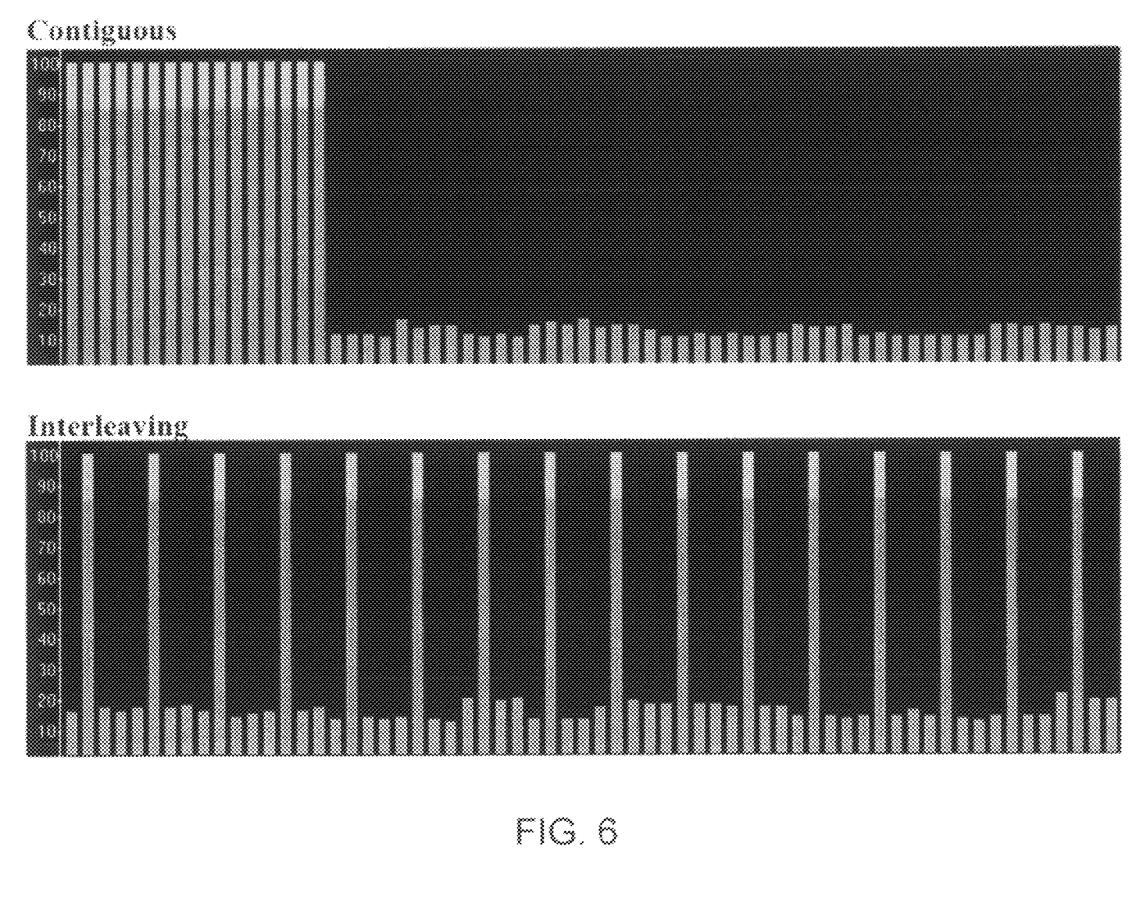
FIG. 6 is a diagram illustrating two distribution schemes for choosing a CPU subset among the superset of CPUs in the system. The first scheme is a contiguous subset of CPUs while the second is an interleaved ordering of CPUs in accordance with an embodiment of the invention.

FIG. 6 is a diagram illustrating two distribution schemes for selecting the CPU subset for the ESP assignments, using a contiguous ordering and an interleaved ordering of CPUs in accordance with an embodiment of the invention. The top graph shows an example where ESPs of an ESP layer are placed on a contiguous set of CPUs. In contrast, the bottom graph shows an example where ESPs of an ESP layer are placed on an interleaved set of CPUs. The interleaved ordering scheme will be used throughout this document as the preferred embodiment of the invention.

Figure 7:
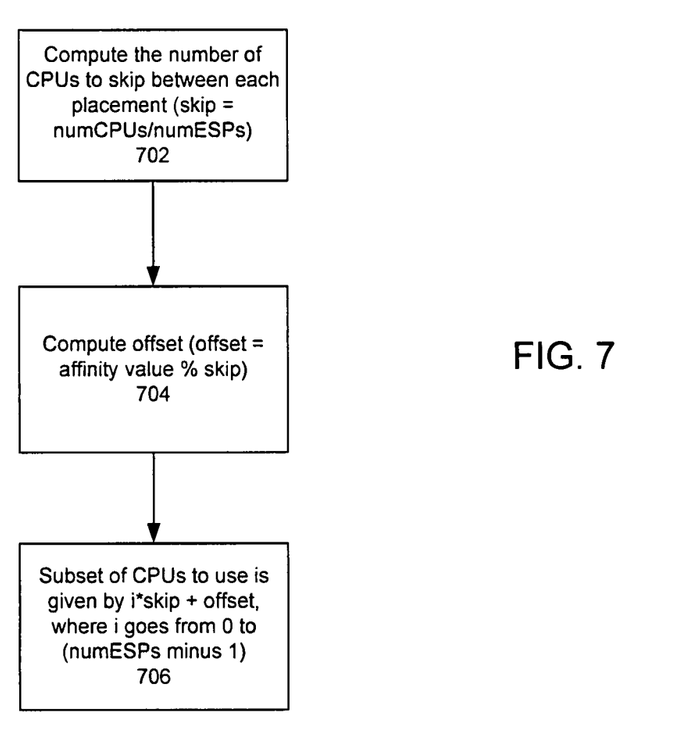
FIG. 7 is a flow chart of a procedure for determining which CPU subset within the affinity group is specified by the affinity value and the number of ESPs in the layer.

FIG. 7 is a flow chart of a procedure for determining which CPU subset within the affinity group is specified by an affinity value. Per block 702, a computation is made as to the numbers of CPUs to skip between each placement. This number skip is equal to the number of CPUs in the system divided by the number of ESPs in a given ESP layer. In one implementation, the result of this division must be an integer greater than or equal to one.

Per block 704, the offset used to start the placement is determined. This offset value is equal to the affinity value modulo (%) the skip number. The result of this modulo operation is a number between zero and (skip−1).

Per block 706, the subset of CPUs to use is given by i multiplied by the skip number plus the offset value, where i goes from zero to the number of ESPs in the ESP layer minus one.

Figure 8:
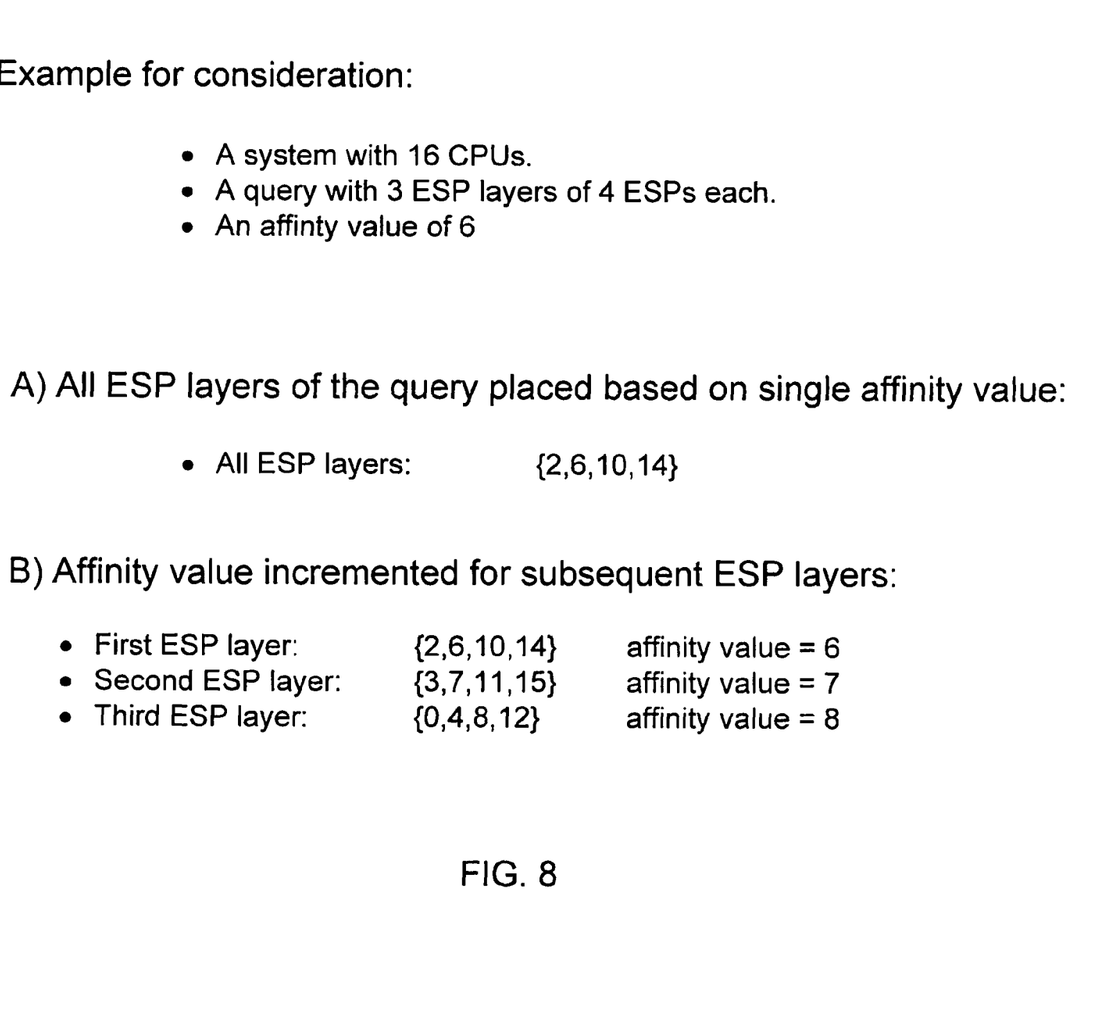
FIG. 8 depicts an example showing a difference in placement of ESP layers without and with cyclical placement in accordance with an embodiment of the invention.

FIG. 8 depicts an example showing a difference in placement of ESP layers without and with cyclical placement in accordance with an embodiment of the invention. Consider the example of a system with 16 CPUs, a query with three ESP layers of four ESPs each. Also, consider that the affinity value is number 6.

Without the cyclical placement option enabled, then the placement of the ESP layers would be in accordance with A) where all ESP layers of the query are placed based on a single affinity value (in this case, affinity number 6). Hence, all four ESP layers would be placed on the CPU subset {2, 6, 10, 14}. Therefore, in this example, only one-quarter of the CPUs are used with non-cyclical placement.

On the other hand, with the cyclical placement option enabled, then the placement of the ESP layers would be in accordance with B) where the first ESP layer is placed according to the affinity number 6. However, the affinity number is incremented by one from 6 to 7 for the placement of the second ESP layer, and the affinity number is further incremented by one from 7 to 8 for placement of the third ESP layer. Thus, while the first ESP layer is placed on the CPU subset {2, 6, 10, 14}, the second ESP layer is placed on the CPU subset {3, 7, 11, 15}, and the third ESP layer is placed on the CPU subset {0, 4, 8, 12}. Therefore, in this example, three-quarters of the CPUs are used with cyclical placement. Advantageously, this cyclical placement provides better load balancing.

Figure 9:
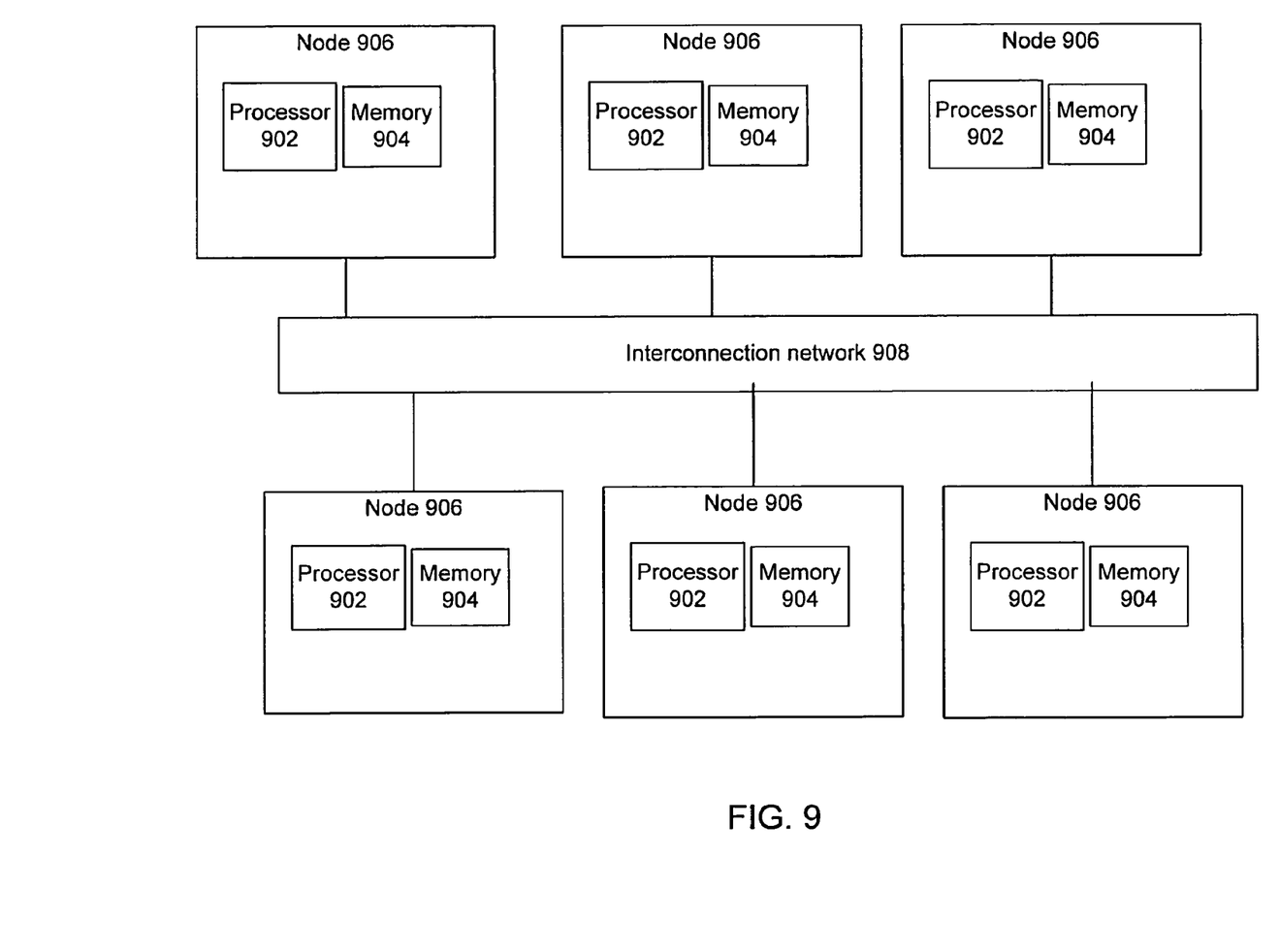
FIG. 9 is a schematic diagram depicting an example computer apparatus which may be configured to perform the methods in accordance with an embodiment of the invention.

FIG. 9 is a schematic diagram depicting an example computer apparatus which may be configured to perform the methods in accordance with an embodiment of the invention. In this example, the computer apparatus comprises a massively parallel processing system. In one embodiment, the computer apparatus may be configured with multiple nodes 906, each node including a processor 902 and associated memory 904. The nodes are interconnected by an interconnection network 908. Other architectures for the computer apparatus may be used in alternate embodiments.

In accordance with an embodiment of the invention, the steps discussed above are implemented as processor-executable instructions stored on a computer-readable medium or stored in computer-readable memory. These processor-executable instructions may be run, for example, on a computer apparatus, such as depicted in FIG. 9, for example.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An automated method to allocate resources of a highly parallel computing system for processing a database query, the method comprising:
  receiving the database query from an application at a client system;
  compiling the query and computing the number of executive server processes (ESPs) in each ESP layer of the query;
  generating an affinity value, wherein the affinity value specifies a subset of processors for a range of processor subset sizes;
  executing the query wherein placement of ESP layers of the query onto processors of the computing system is determined using the affinity value; and
  returning results of the execution to the application.

2. The method of claim 1, further comprising computing a maximum degree of parallelism for the query.

3. The method of claim 2, wherein said computing of the maximum degree of parallelism includes computing an estimated memory resource required by the query and an estimated CPU resource required by the query.

4. The method of claim 1, wherein an interleaved ordering of processors is used in forming CPU subsets.

5. The method of claim 1, wherein the subset of processors specified by the affinity value is given by a variable multiplied by a skip value plus an offset value, where the variable goes from zero to the number of executive server processes in an ESP layer minus one.

6. The method of claim 1, wherein cyclical placement is used when placing ESP layers onto CPU subsets.

7. The method of claim 1, wherein the affinity value is based on a current S run-time state of the system.

8. The method of claim 1, wherein the affinity value is randomly generated.

9. The method of claim 1, wherein the affinity value is based on a source of the query.

10. A highly parallel computing apparatus for an enterprise data warehouse system or a business intelligence system, the apparatus comprising:
  a plurality of processors in the highly parallel computing apparatus;
  memory resources in the highly parallel computing apparatus;
  a database server configured to receive a database query from an application at a database client system;
  a query compiler configured to prepare an execution plan for the query and compute a number of executive server processes (ESPs) in each ESP layer of the query;
  a workload management system configured to generate an affinity value based on the current run-time state of the apparatus, wherein the affinity value specifies a subset of processors for a range of processor subset sizes; and
  a query executor configured to execute the query wherein placement of ESP layers of the query onto processors of the computing system is determined using the affinity value.

11. The apparatus of claim 10, further comprising a query optimizer module configured to compute a maximum degree of parallelism for the query.

12. The apparatus of claim 11, wherein said computing of the maximum degree of parallelism includes computing an estimated memory resource required by the query and an estimated processor resource required by the query.

13. The apparatus of claim 10, wherein an interleaved ordering of processors is used in forming processor subsets.

14. The apparatus of claim 10, wherein the subset of processors specified by the affinity value is given by a variable multiplied by a skip value plus an offset value, where the variable goes from zero to the number of executive server processes in an ESP layer minus one.

15. The apparatus of claim 10, wherein cyclical placement is used when placing ESP layers onto CPU subsets.

16. The apparatus of claim 10, wherein the affinity value is based on a current run-time state of the apparatus.

17. The apparatus of claim 10, wherein the affinity value is randomly generated.

18. The apparatus of claim 10, wherein the affinity value is based on a source of the query.

19. An enterprise warehouse or business intelligence system comprising:
  a plurality of processors configured to execute computer-readable instructions;
  memory configured to store computer-readable instructions and data;
  processor-executable code for a database server which is configured to receive a database query from an application at a database client system;
  processor-executable code for a workload management system configured to generate an affinity value, wherein the affinity value specifies a subset of processors for a range of processor subset sizes;
  processor-executable code for a query compiler configured to prepare an execution plan for the query and compute a number of executive server processes (ESPs) in each ESP layer of the query; and
  processor-executable code for a query executor configured to execute the query wherein placement of ESP layers of the query onto processors of the computing system is determined using the affinity value.

20. The method of claim 1, comprising:
  computing an estimated memory resource (EMR) required by the query, and an estimated CPU resource (ECR) required by the query;
  computing a first ratio of the EMR to an amount of memory available per CPU, and a second ratio of the ECR to an amount of work acceptable to be assigned per CPU; and
  computing a maximum degree of parallelism for the query as a function of greater of the first ratio and the second ratio.

21. The apparatus of claim 11, wherein computing the maximum degree of parallelism comprises:
  computing an estimated memory resource (EMR) required by the query, and computing an estimated CPU resource (ECR) required by the query;
  computing a first ratio of the EMR to a first constant representing an amount of memory available per CPU, and computing a second ratio of the ECR to a second constant representing an amount of work acceptable to be assigned per CPU; and
  selecting a maximum value of the first ratio versus the second ratio.

* * * * *